(12) United States Patent
Patti et al.

(10) Patent No.: US 8,352,992 B1
(45) Date of Patent: Jan. 8, 2013

(54) WIRELESS MEDIA STREAMING

(75) Inventors: Andrew J. Patti, Cupertino, CA (US); Wai-Tian Tan, Sunnyvale, CA (US); Bo Shen, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 633 days.

(21) Appl. No.: 12/248,356

(22) Filed: Oct. 9, 2008

(51) Int. Cl.
*H04N 7/173* (2011.01)
(52) U.S. Cl. ............................ 725/105; 725/81; 725/114
(58) Field of Classification Search .................. 725/105, 725/114, 81
See application file for complete search history.

(56) References Cited

U.S. PATENT DOCUMENTS

| | | | | |
|---|---|---|---|---|
| 7,797,723 | B2 * | 9/2010 | Demircin et al. | 725/143 |
| 7,895,629 | B1 * | 2/2011 | Shen et al. | 725/62 |
| 2001/0021998 | A1 * | 9/2001 | Margulis | 725/81 |
| 2003/0009578 | A1 * | 1/2003 | Apostolopoulos et al. | 709/231 |
| 2005/0180415 | A1 * | 8/2005 | Cheung et al. | 370/389 |
| 2007/0180106 | A1 * | 8/2007 | Pirzada et al. | 709/224 |
| 2007/0206635 | A1 * | 9/2007 | Pozhenko et al. | 370/473 |
| 2007/0234385 | A1 * | 10/2007 | Bopardikar et al. | 725/38 |
| 2008/0040757 | A1 * | 2/2008 | Romano et al. | 725/81 |
| 2008/0134005 | A1 * | 6/2008 | Izzat et al. | 714/774 |
| 2008/0137728 | A1 * | 6/2008 | Van Der Stok et al. | 375/240.01 |
| 2008/0191816 | A1 * | 8/2008 | Balachandran et al. | 333/24 R |
| 2008/0192710 | A1 * | 8/2008 | Balachandran et al. | 370/338 |
| 2008/0192711 | A1 * | 8/2008 | Balachandran et al. | 370/338 |
| 2008/0232315 | A1 * | 9/2008 | Bachl et al. | 370/329 |
| 2008/0232503 | A1 * | 9/2008 | Kim | 375/267 |
| 2009/0219992 | A1 * | 9/2009 | Wang | 375/240.03 |
| 2010/0054215 | A1 * | 3/2010 | Stahl et al. | 370/337 |

OTHER PUBLICATIONS

Patti, Andrew et al., "Low Latency Adaptive Streaming of HD H.264 Video Over 802.11 Wireless Networks with Cross-Layer Feedback", *Applications of Digital Image Processing XXX., Proceedings of the SPIE*, vol. 6696., (Oct. 2007),12 pgs.

* cited by examiner

*Primary Examiner* — Pankaj Kumar
*Assistant Examiner* — Mulugeta Mengesha (57) ABSTRACT

Streaming is discussed. A method for wireless media streaming comprises receiving media data from a remote media source, transmitting the media data over a wireless connection to an electronic device, receiving data-link information, accessing the data-link information at an application layer, and determining at the application layer whether to change a transmission rate of the media data to the electronic device. The data-link information is received from the electronic device. The determination is based at least in part on the data-link information.

20 Claims, 4 Drawing Sheets

WIRELESS MEDIA STREAMING

FIELD

Embodiments of the present invention relate in general to the field of wireless streaming.

BACKGROUND

Wireless local area networks, for instance, IEEE 802.11, have been increasingly used for streaming multimedia in the home. With the increased home-use of real-time, or live, video-rich content, and high-definition (HD) television, more content is transmitted over wireless endpoints delivered over 802.11 links.

Transmitting HD video over IEEE 802.11 poses unique challenges due to the error-prone underlying physical layer (PHY), which may result in unpredictable chunks of packet losses. Congestion may exacerbate these problems and lead to further losses. The challenges are aggravated for HD video which has a large number of packets per video frame.

The IEEE 802.11a/b/g/n distributed coordination function and PHY provide methodologies and mechanisms to adapt to these losses. These mechanisms include collision detection, retransmission back-off counters and limits, and various modulation and coding rates. All of these impact achievable bit-rate and latency. In addition, the 802.11e specification addresses quality of service (QOS) for multimedia and provides access classes designed to provide better throughput and network access for voice and video streams.

To further improve media streaming over 802.11, a number of cross-layer design strategies have been proposed that share information and provide control across boundaries that are normally kept separate by network protocol and operating system application programming interface layering. Some proposed cross-layer strategies generally require either a significant modification of existing wireless systems, or provide some unreliable error recovery mechanisms such as forward error correction codes.

Some adaptation strategies include support of server adaptation by addition of application-level client feedback. Client feedback for video streaming may be performed using application-level protocols and may involve a specially designed matching client. Unfortunately, client feedback requires additional wireless bandwidth for sending the status reports and incurs significantly greater latency. Further, some application-level methods for estimating available instantaneous bandwidth send special probing data that does not benefit the video stream and consumes bandwidth. These strategies are most relevant when the limiting link in the network is either unknown or uncontrollable and directly observable.

DESCRIPTION OF EMBODIMENTS

Reference will now be made in detail to various embodiments of the present invention, examples of which are illustrated in the accompanying drawings. While the present invention will be described in conjunction with the various embodiments, it will be understood that they are not intended to limit the invention to these embodiments. On the contrary, embodiments of the present invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

Various embodiments of the present invention, wireless media streaming, are discussed. In one embodiment, a method for wireless media streaming comprises receiving media data from a remote media source, transmitting the media data over a wireless connection to an electronic device, receiving data-link information, accessing the data-link information at an application layer, and determining at the application layer whether to change a transmission rate of the media data to the electronic device. The data-link information is received from the electronic device. The determination is based at least in part on the data-link information. In one embodiment, the transmission rate of data may be changed by changing the video source rate at an application level and/or changing the bit-rate transmission at the physical layer ("PHY"). In another embodiment, the change of transmission rate is communicated to the remote media source. In a further embodiment, the change of transmission rate is selected from a plurality of media sources.

Figure 1:
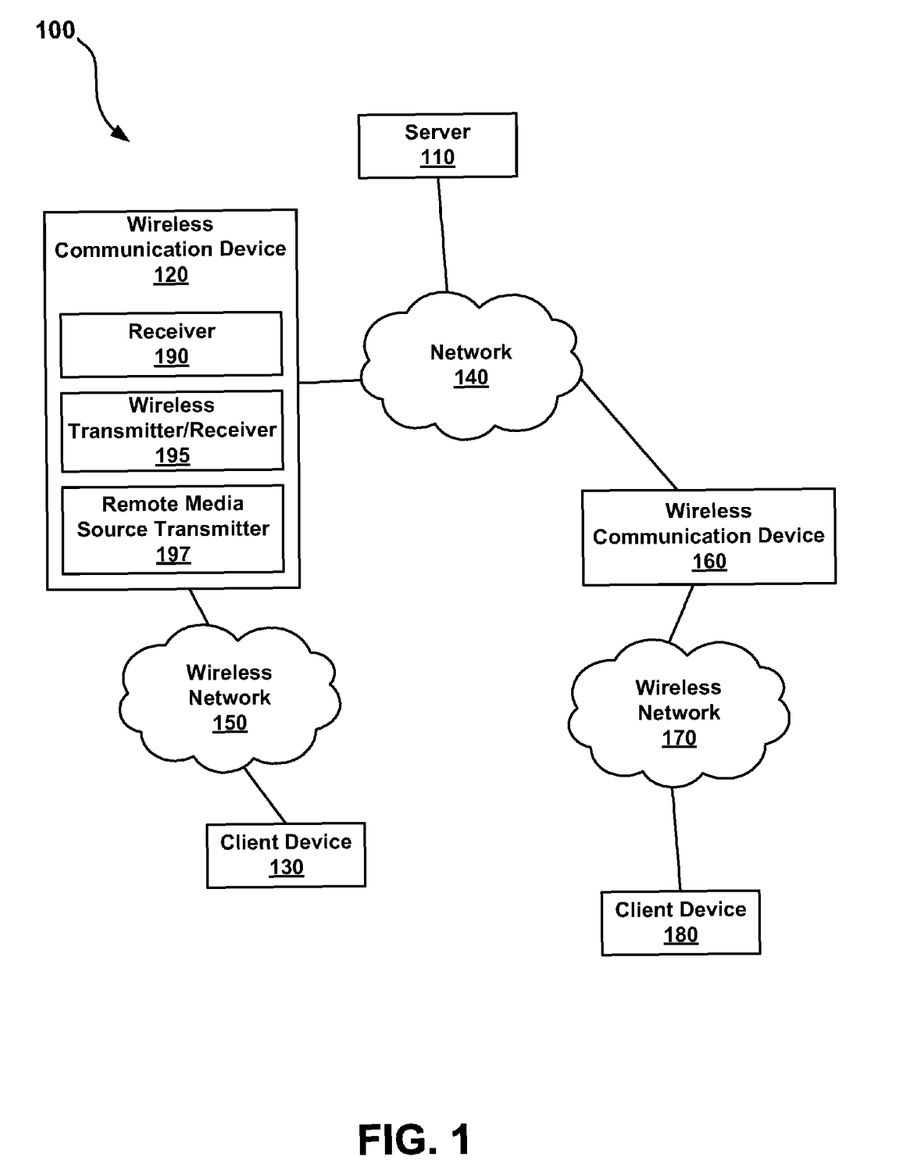
FIG. 1 illustrates a communication network, in accordance with embodiments of the present invention.

FIG. 1 illustrates a communication network 100, in accordance with embodiments of the present invention. In the communication network 100, a server 110 communicates with wireless communication devices 120 and 160 (e.g. wireless access points) via a network 140. The server 110 is a media server. It should be apparent that the network 140 may be any network, such as the Internet, a local area network, a wireless network, and the like. The wireless communication devices 120 and 160 communicate with client devices 130 and 180 via wireless networks 150 and 170, respectively. It should be appreciated that there can be any number of wireless communication devices, networks, and any number of client devices.

In various embodiments, the server 110 is a remote media server that transmits media data to multiple wireless communication devices. In one embodiment, the server 110 transmits similarly encoded media data to different wireless communication devices. In another embodiment, the server 110 transmits differently encoded media data to different wireless communication devices. In still another embodiment, the server 110 transmits multiply encoded media data to different wireless communication devices. The wireless communication device 120 is a media server that communicates wireless media streaming to the client device 130. In some embodiments, the wireless communication device 120 performs some or all of the functions of the server 110, such as encoding, as discussed herein. The client device 130 may be any electronic device that can receive a streaming media, such as a router, a television, a computer, or the like.

In some embodiments, the server 110 transmits a plurality of bit streams encoded data at different bit rates to wireless communication devices 120 and 160. In other embodiments, the server 110 transmits media data requested at one or more specific bit rates to the wireless communication devices 120 and 160. The wireless communication devices 120 and 160 transmit one media stream to the client devices 130 and 180, respectively.

In various embodiments, the wireless communication device 120 comprises a receiver 190, a wireless transmitter/receiver 195, and a remote media source transmitter 197. The receiver 190 is configured to receive media data from a remote media source, such as server 110. The wireless transmitter/receiver 195 is configured to transmit the media data over a wireless connection to an electronic device, such as client device 130, to receive data-link information from the electronic device, to access the data-link information at an application layer, and to determine at the application layer whether to change a transmission rate of the media data based at least in part on the data-link information, wherein determining whether to change the transmission rate is transparent to the electronic device, as discussed herein. In various embodiments, the remote media source transmitter 197 is configured to communicate the change in transmission rate to the remote media source. The remote media source transmitter 197 may be any network device that can communicate with the server 110, such as a router, wireless router, switch, hub, or the like.

Figure 2:
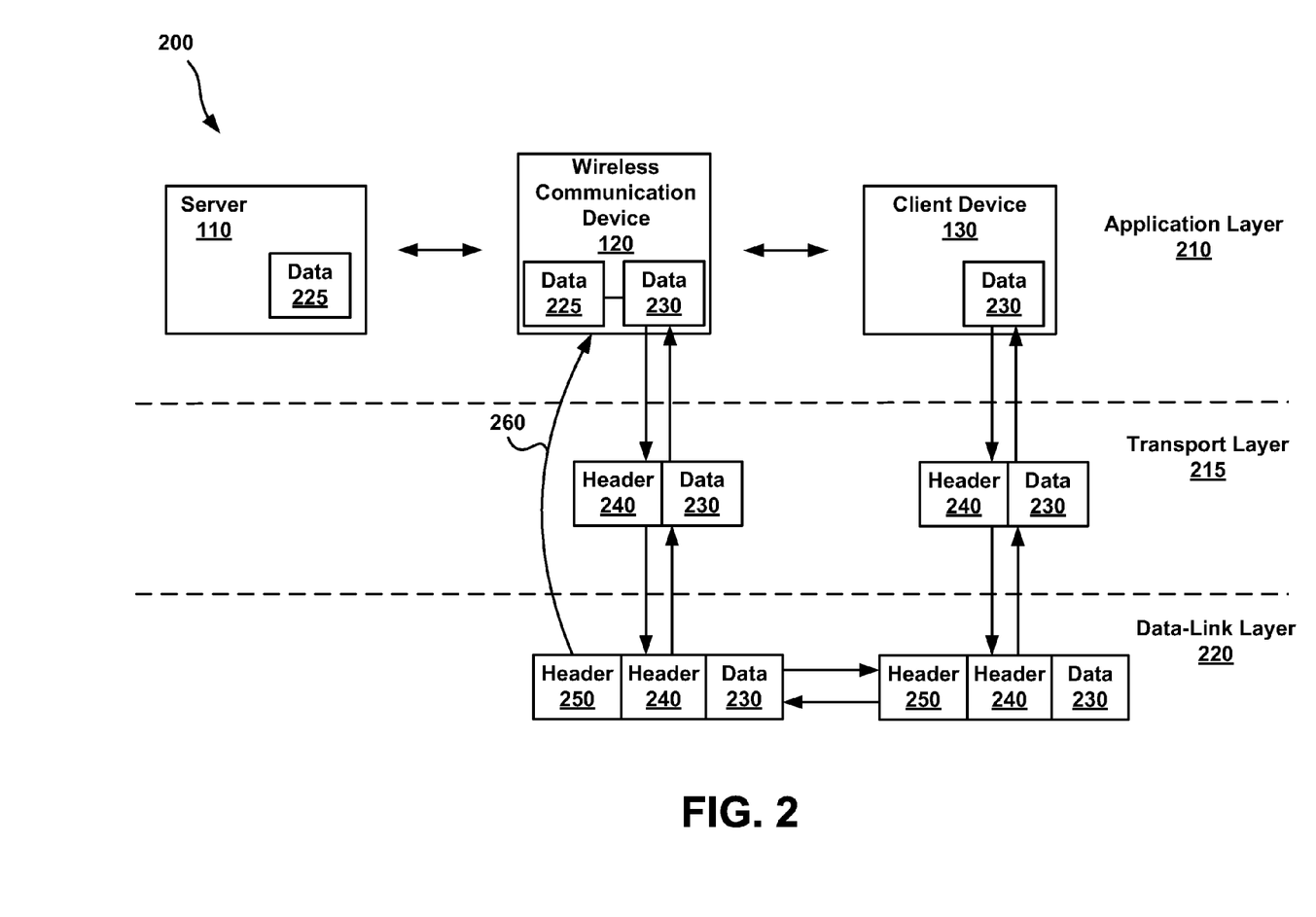
FIG. 2 illustrates cross-layer communication network, in accordance with embodiments of the present invention.

FIG. 2 illustrates cross-layer communication network 200, in accordance with embodiments of the present invention. The network comprises a server 110, an wireless communication device 120, and a client device 130, for example, a client. The server 110, such as an application level streaming server communicates with the wireless communication device 120. The wireless communication device 120 communicates with the client device 130. In various embodiments, the wireless networks 150 and 170 are operating a wireless protocol, such as an 802.11 family of protocols. The server 110, the wireless communication device 120, and client device 130 communications may transmit as real-time transport protocol and real-time control protocol, respectively.

The server 110 transmits streaming media, such as data 225, at an application level 210 to the wireless communication device 120. In one embodiment, streaming media is streaming video. The wireless communication device transmits streaming media, such as data 230, to the client device 130. Data 230 is derived from data 225. For example, in the case where multiple video streams are sent simultaneously, data 225 would contain a video slice at each encoded data rate. Data 230 would then be the slice for the actual data rate chosen for transmission.

In some embodiments, data 225 is transmitted as streaming media with multiple different encodings and/or bit rates. In other embodiments, data 225 is transmitted as streaming media with one encoding and/or bit rate. Data 230 is transmitted as streaming media with one encoding and/or bit rate at a time and the transmission encoding and/or bit rate may be changed at the wireless communication device 120. Data 230 may travel through multiple layers. The data 230 of the streaming media travels down through a transport layer 215, down and across a data-link layer 220 and back up through the transport layer 215. In some embodiments, the data-link layer includes an 802.11 media access control layer. In various embodiments, the data 230 travels through other layers not depicted.

As the data travels down layers, headers and/or footers may be added to packets of the data 230, such as headers 240 and 250. Information in the headers is used at different layers. As the data 230 travels back to the application layer 210, the headers are stripped and dropped. To obtain data-link information, such as information contained in header 250, traffic in the data-link layer 220 may be monitored, captured and sent to the application layer 210, as shown via arrow 260. Without capturing data-link information in the data-link layer 220, the information may be lost.

Data-link information may be any information contained in a header, such as the header 250, attached to data transmissions in the data-link layer 220, and/or determined from monitoring the data-link layer 220. Data-link information may include acknowledgement information, such as an ACK status, a number of transmission attempts, a physical layer ("PHY") rate used to transmit a packet, a queue depth, and/or other information used for a data-link protocol, such as received strength of a wireless environment, or the received signal strength indicator. The ACK status contains information regarding a status of all transmitted packets. By storing a sequence number and using the ACK status, packets not acknowledged may be determined. The number of transmission attempts is a number of times a packet is sent, whereby the sender has not received an acknowledgment of the packet being received. The PHY rate is a transmission bit rate. The queue depth is the depth of a packet queue awaiting transmission. Obtaining the data-link information is further discussed with regards to FIG. 3 and herein.

Data-link information may be obtained without using an application-layer client. Also, using available data-link information avoids application-layer attempts by the wireless communication device 120 and/or the server 110 to gain additional information from the client device 130, such as an attempt using extended-Real-time Transport Control Protocol (xRTCP). Using xRTCP may generate delay and may require a cooperative client.

Figure 3:
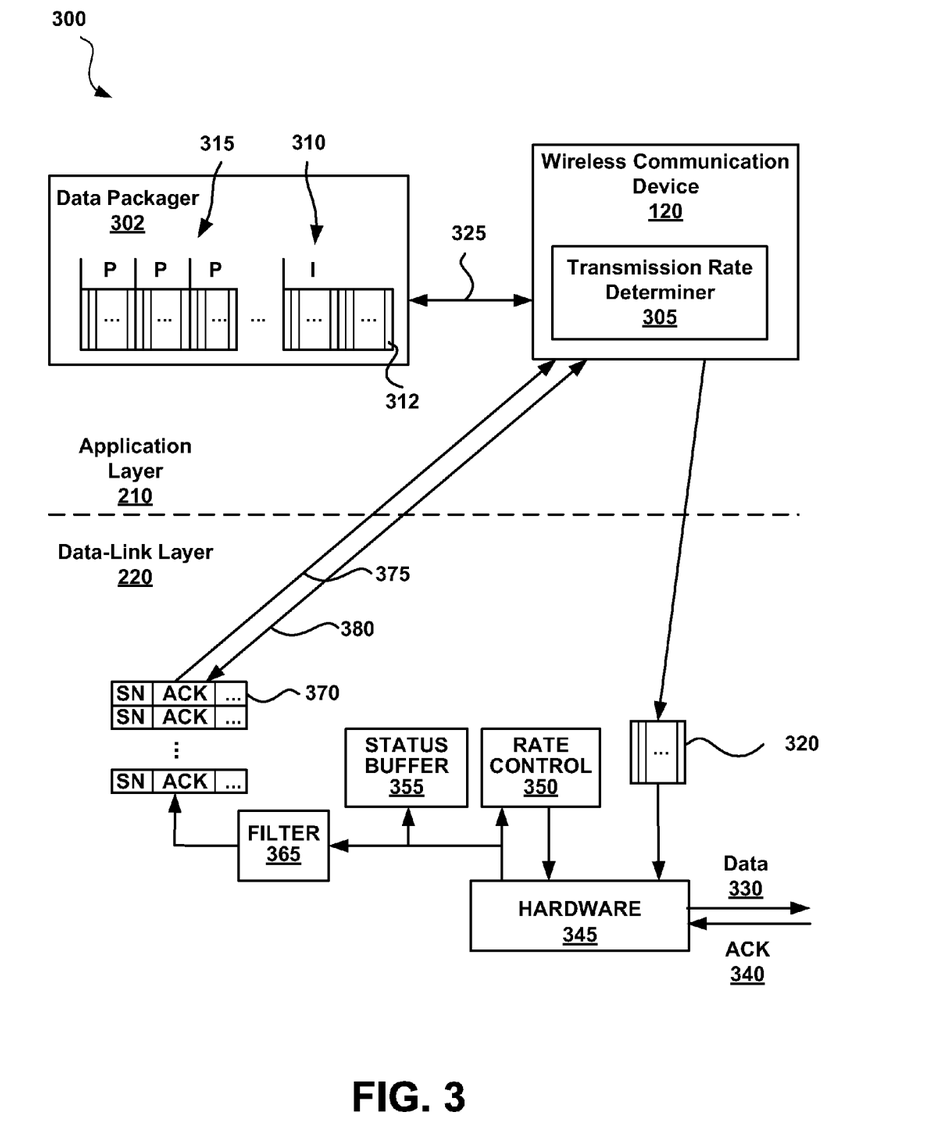
FIG. 3 illustrates wireless communication and control, in accordance with embodiments of the present invention.

FIG. 3 illustrates wireless communication and control 300, in accordance with embodiments of the present invention. The control system 300 can be implemented in software, firmware, hardware, or any combination thereof for performing the below described method for wireless media streaming. A data packager 302 and a transmission rate determiner 305 run in the application layer 210. In some embodiments, the data packager 302 resides in the server 110, not depicted. In other embodiments, the data packager 302 resides in the wireless communication device 120, not depicted. The transmission rate determiner 305 resides in the wireless communication device 120. The data packager 302 transmits data to the transmission rate determiner 305 via path 325. The data contains video streaming data from the data packager 302 and request data from the transmission rate determiner 305.

In various embodiments, the data packager 302 uses a source rate control to control the video source rate. The data packaging may be dependent on the data packager 302. In some embodiments, the data packager 302 and transmission rate determiner 305 are streaming applications that transmit video packets.

The streaming application incorporates data into I-frames 310 and P-frames 315. The I-frame generally contains more packets, such as packet 312, than the P-frame. In some embodiments, the packets are marked for identification by the data packager 302. In other embodiments, the packets are marked for identification by the transmission rate determiner 305. In still further embodiments, the packets are marked for identification by data packager 302 and/or the transmission rate determiner 305. For example, packets using a real-time transport protocol may use the Internet Protocol Differentiated Services (IPDS) Code Point bit-fields for tagging and/or marking. As there are effectively four access classes, that is, voice, video, background and best-effort, of the IPDS Code Point bit fields used in 802.11e, and the access classes do not use all the bits, there are ample spare bits available for marking.

In various embodiments, video packets are marked as a subclass of the video access class (AC), for example AC VI. The video packets are sent on an 802.11 video queue. As, the wireless local area network (WLAN) layer already examines the DSCP bit fields, there is no new layer violation. In some embodiments, the WLAN layer maintains a status in a fixed length, circular buffer for all frames transmitted.

In one embodiment, I-frames followed by P-frames are queued in slices, such as slice 320, and transmitted to hardware 345 in the data-link layer 220. The data, such as data 330 is sent to the client device 130, not depicted. The data-link layer 220 below the client device 130 returns data-link information, such as an ACK 340, to the hardware 345. In various embodiments, data-link information is passed to a rate control 350. The rate control 350 may direct the hardware 345 to transmit at different bit-rate transmissions. In various embodiments, the transmission rate determiner 305 provides input to the rate control 350.

The hardware 345 passes data-link information to a status buffer 355 and a filter 365, as indicated by arrows. The status buffer 355 contains typical information for wireless layer export, such as RSSI, a number of accrued PHY errors, and the like.

The filter 365 filters on the sequence-number and/or numbers that were marked and/or tagged in the status buffer 355. Thereby, feedback and data 370 may be provided to the transmission rate determiner 305 without requiring storage of information for packets not within flows of interest.

To provide access for the transmission rate determiner 305 access to the status buffer 355 (on UNIX-like systems) and receive data 370, a character driver may be implemented within a wireless local area network driver. The character driver implements an "open", "close", and "read" functionality. Although the read call is blocking, the transmission rate determiner 305 may use a "select" mechanism to query a status of the read. The wireless communication device 120 may then place a chunk of packets on the wireless queue and then use "read" via path 375 with "select" via path 380 to effectively receive an interrupt when status becomes available. The wireless communication device 120 may then manage retransmissions, in addition to any wireless local area network layer retransmissions, according to a media timeline, thus controlling the packets and/or the number of packets in the queue.

In various embodiments, the transmission rate determiner 305 may obtain a timely throughput estimate by timing a period between sending chunks and receiving a status that all packets have been successfully sent and/or received. The estimate is reliable for detecting a drop in throughput rates that may result from both congestion and deteriorating signal-to-noise ratio. Additionally, the estimate may be determined without additional probing for data and without additional application-layer client feedback.

After analyzing the data-link information, the transmission rate determiner 305 may make adjustments to the source video rate and/or retransmit packets. The transmission rate may be increased and/or decreased. The transmission rate may be adjusted by selecting an available stream with the data encoded at a different bit rate (stream switching), encoding the data at a different bit rate, transcoding the data, and/or scalably encoding the data. In some embodiments, retransmitting the packets uses the number of packet sending retries and/or a type of frame. For example, if the frame is an independently decodable frame, then the frame may be resent, otherwise, it is not. In other embodiments, the bit-rate is matched to available throughput using the throughput estimate. An advantage is that the transmission rate may be changed transparent to the client device 130.

Stream switching uses pre-coded versions of the stream at different bit-rates. When available bandwidth suddenly increases and/or decreases, a smooth transition may be made from a higher to lower rate video or a lower to higher rate video, respectively, without dropping any slices. In various embodiments, versions of the video stream are encoded to have the same resolution, and further use the same slice structure. That is, the frames corresponding to the same media playback time, within the various bit-rate (i.e., quality) sequences, have a same number of slices, and the slices have a same alignment and spatial dimension relative to the frame. The wireless communication device 120 may complete the sending of all packets in the current slice when throughput drops too low, or when an estimated client video packet buffer slips too far behind relative to the media playback timeline. Then the wireless communication device 120 may send a next slice from the appropriate position in the lower rate stream and thus seamlessly switch to a lower bit-rate stream without any client-side adaptation. In some embodiments, the transition may occur at any slice boundary, and need not occur in an I-frame. Similarly, the wireless communication device 120 may send a next slice from the appropriate position in a higher rate stream when bandwidth improves. For example, when another competing video stream stops playing on a different client-server pair.

The completion of sending packets remaining in the slice may require application-level retransmissions in addition to those carried out by the 802.11 layer. In various embodiments, a relatively small number of 802.11 retries, such as three retries, are transmitted prior to the transmission rate determiner 305 managing additional retries. The transmission rate determiner 305 may take a media playback timeline into account to determine if a more drastic frame and/or slice dropping is appropriate.

In various embodiments, the video slice structure used with HD streams may be different than with non-HD streams, thereby avoiding adaptation latency. A highest bit-rate stream may contain a large number of packets per slice—possibly over 100. If there are only a few slices in each frame there could be too many packets to transmit prior to switching to a lower bit-rate stream for the next slice. A delay in switching may be detrimental to timeline management. To avoid timeline management problems, the I-frames may be structured to contain enough slices so the number of packets per slice is low enough so that a delay in sending all remaining packets prior to switching is not relatively large. This is a trade-off between a small enough number of packets in each slice to allow low-latency stream switching (without slice loss), and a large enough number of packets in each slice to take advantage of 802.11e bursting and 802.11n aggregation. For example, for 1080p content, 25 slices per frame when are transmitting over 802.11a using 802.11e. At 25 slices per frame with a bandwidth of 14 Megabits per second, each slice would contain approximately 10 packets. To avoid inefficient use of bandwidth by having undersized single-packet slices that contain a number of bytes far lower than the minimum transmission unit, P-frames are structured to have fewer slices, such as a factor of 5×1 slices for I-frames to P-frames.

In various embodiments, application-layer forward error correction is not used, thereby retransmitting when necessary and reducing the source bit-rate if lagging. This combination is desirable because there is timely detection of throughput changes and media timeline slippage. Further, retransmission determinations may be based on individual packet information, as exact knowledge of which packets were and were not successfully received is obtained.

Adaptively encoding the data at a different bit rate, transcoding the data, and scalably encoding the data in general have advantages that a rate adaptation may be with very fine granularity and may be dynamically switched on and off any time during a session. Also there is no need to generate multiple streams, as with stream switching. However, with transcoding there is an additional encoding generation loss incurred, and the transcoding/adaptive-encoding process may be computing intensive. In addition, scalable video is not widely supported and requires more bits for a given quality.

In some embodiments, the server 110 may encode the data at a different bit rate, or re-encode. With re-encoding, the original video is fully decoded and encodes the result at a lower bit rate. Re-encoding produces high quality transcoding, but is computing intensive.

In other embodiments, the server 110 transcodes the data. Transcoding reuses mode information from the original video when encoding the lower bit rate version. For H.264, the mode information includes luma and chroma prediction mode and transform size decision for intra-macro blocks, and variable block size, motion, reference frame selection, temporal prediction direction and more for inter-macro blocks. During a regular encoding session, the complexity of estimating these modes may be significant. For example, there are four possible prediction modes for intra 16×16 MB, and nine for either intra 4×4 or intra 8×8 MB. Although correlations may be explored during the evaluations of all the modes, the complexity remains high. Reusing the mode information from the original video during transcoding may reduce the complexity. However, the mode inherited from the original video may not be optimal, which may lead to relatively lower quality in comparison with re-encoding.

In further embodiments, the server 110 scalably encodes the data. Scalably encoded data allows the server 110 to selectively drop packets to reduce the bit rate.

In other embodiments, the transmission rate determiner 305 is part of a video conferencing application. The video conferencing application may contain applications residing in the application layer, such as a data packager and transmission rate determiner, running on one or both server and client sides.

In some embodiments, knowledge of the greater number of packets/slice in HD streams is leveraged with the cross-layer design, in order to obtain a reliable, up-to-date, assessment of available bandwidth. Thereby enabling a determination of available additional throughput, thus maximizing video quality. Leveraging this information has an advantage over obtaining information via probing to determine throughput as probing may result in video freeze/breakup. Otherwise without leveraging this information, the bit-rate stream may remain at a lower quality and/or stay at a lower bit-rate stream. Additionally, determining additional bandwidth may be based on data-link information from bursts of transmitted video packets. Bursts are a sequence of packets pushed to the network as fast as possible and/or as fast as reasonably achievable with some consideration for network traffic.

In various embodiments, a slice structure encoding is used that supports fast stream switching without incurring noticeable video drift artifacts. In some embodiments, slice encoding is performed by encoding with more slices for I-frames than P. This allows an avoidance of video freeze and breakup, as a typical I-frame HD slice has so many packets it would take a long time to complete slice transmission—even if a problem is previously detected. In other embodiments slice encoding is performed using lower bit-rate streams that have similar spatio-temporal slice structures as a highest rate stream, for example, same slice structure/layout, which implies there will be less packets/slice for the lower rate streams. In some embodiments, noticeable video drift artifacts are minimized using slice encoding wherein the data is transmitted in slices, wherein the slices of a highest bit rate stream have approximately an equal number of packets per slice, regardless of frame type which is different from conventional encoding. In some embodiments, the approximate equal number of packets per slice is within 15% of each other. For example, an I frame within the highest bit rate stream having slice structure and bit rate resulting in 25 packets per slice, will imply a P frame within the highest bit rate stream will have slice structure such that the P frame slice contains no fewer than 21 packets per slice. In other embodiments, the approximate equal number of packets per slice in the highest bit rate stream is within 20 packets per slice.

Figure 4:
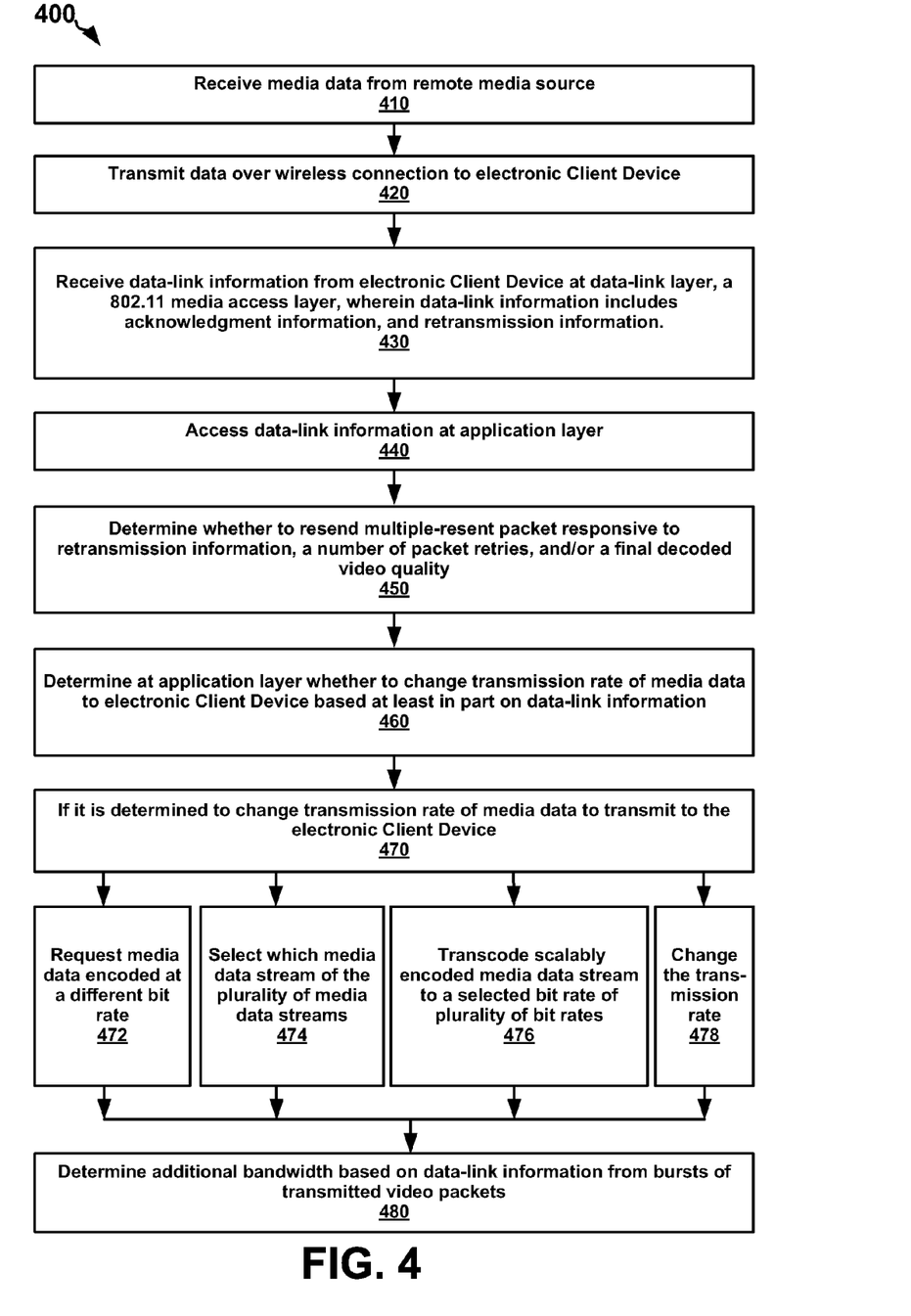
FIG. 4 is a flow chart illustrating a process for video streaming, in accordance with embodiments of the present invention.

FIG. 4 is a flow chart illustrating a process 400 for video streaming, in accordance with embodiments of the present invention. In one embodiment, process 400 is carried out by processors and electrical components under the control of computer readable and computer executable instructions, such as a program. The computer readable and computer executable instructions reside, for example, in data storage features such as computer usable volatile and non-volatile memory, computer-readable storage medium. However, the computer readable and computer executable instructions may reside in any type of computer readable medium. In one embodiment, process 400 is performed by the wireless communication device 120 of FIG. 1

In step 410, the wireless communication device 120 receives media data from a remote media source, such as the server 110. In some embodiments, the media data is a single media data stream. In other embodiments, the media data is a scalably encoded media data stream that can be transcoded to a plurality of bit rates. In still further embodiments, the media data is a plurality of media data streams encoded at different bit rates. In various embodiments the media data consists of video packets. In other embodiments, the data consists of a combination of video, picture, audio, administrative information, and/or the like.

In step 420, the wireless communication device 120 transmits media data over a wireless connection to an electronic device, such as client device 130.

In step 430, the wireless communication device 120 receives data-link information from the client device 130. In some embodiments, the wireless communication device 120 receives data-link information associated with the device from the data-link layer 220, such as a number of attempts to send a packet to the client device 130. In some embodiments, the data-link layer 220 is an 802.11 media access control layer. The data-link information may be acknowledgement information from the client device 130, retransmission information, and/or other data-link layer information as discussed herein.

In step 440, the wireless communication device 120 accesses the data-link information at the application layer 210 via path 260. In various embodiments, as shown in step 450, the retransmission information is used to determine whether to resend a multiple-resent packet. The resending determination may be based at least in part on a number of packet sending retries and/or a type of frame of the multiple-resent packet. In other embodiments, the resending determination is based on a final decoded video quality, wherein the frame type is one indicator of video quality when a packet is lost. Other indicators of video quality may include network traffic, and parameters such as received signal strength indicator and a signal-to-noise ratio. In some embodiments, the determination to retransmit information is made at the application layer 210.

In various embodiments, as shown in step 460, the wireless communication device 120 determines at the application layer 210 whether to change a transmission rate of the media data to the electronic device based at least in part on the data-link information.

In step 470, if it is determined to change the transmission rate of media data, the change is made in one step of steps 472, 474, 476, and 478. In various embodiments, the determination whether to change the transmission rate is transparent to the client device 130.

In some embodiments, as in step 472, the transmission rate is changed by requesting media data encoded at a different bit rate from the data packager 302. The requested different bit rate may be pre-packaged or determined after the request is received. The request may be an iterative process, that is, an incremental increase or decrease may be requested several times until a desired bit rate is established. In one embodiment, the actual bit-rate is requested. In another embodiment, a request for a changed bit-rate is requested.

In other embodiments, as in step 474, the transmission rate is changed by selecting which media data stream of the plurality of media data streams. In one embodiment, the plurality of media streams is transmitted continuously. In another embodiment, the plurality of media streams is adjusted based on network traffic. For example, three media streams are transmitted when network traffic is high and more media streams are transmitted when network traffic decreases. In one embodiment, the media streams are based on a requested range of bit rates and/or quantity of streams.

In further embodiments, as in step 476, the transmission rate is changed by transcoding scalably encoded media data stream to a selected bit rate of plurality of bit rates. In one embodiment, the transcoding scalably encoded media data stream is peeled at the wireless communication device 120 to allow lower bit rate transmission.

In other embodiments, as in step 478, the transmission rate is changed by transcoding at the application layer 210 of the wireless communication device 120.

In various embodiments, as shown in step 480, the wireless communication device 120 determines if there is additional bandwidth based on data-link information from bursts of transmitted video packets. In some embodiments, if it is determined that there is additional bandwidth, the transmission rate is increased.

While the invention is described in conjunction with various embodiments, it is understood that they are not intended to limit the invention to these embodiments. On the contrary, the invention is intended to cover alternatives, modifications and equivalents, which may be included within the spirit and scope of the invention as defined by the appended claims.

What is claimed is:

1. A method for wireless media streaming comprising:
receiving media data from a remote media source;
transmitting said media data over a wireless connection to an electronic device;
receiving data-link information from said electronic device;
passing said data-link information to a status buffer located in a data-link layer and a filter located in said data link layer, wherein said filter filters packets based on at least one sequence number of a packet that was marked in said status buffer, and wherein feedback and data is provided to a transmission rate determiner in an application layer without requiring storage of information for packets not within flows of interest;
accessing said data-link information at said application layer, wherein said data-link information is obtained without using an application-layer client; and
determining at said application layer whether to change a transmission rate of said media data to said electronic device based at least in part on said data-link information.

2. The method of claim 1 further comprising:
if it is determined to change said transmission rate of said media data, requesting said media data encoded at a different bit rate.

3. The method of claim 1, wherein said receiving media data comprises a plurality of media data streams encoded at different bit rates.

4. The method of claim 3 further comprising:
if it is determined to change said transmission rate of said media data, selecting which media data stream of said plurality of media data streams to transmit to said electronic device.

5. The method of claim 1, wherein said media data comprises a scalably encoded media data stream that can be transcoded to a plurality of bit rates.

6. The method of claim 5 further comprising:
if it is determined to change said transmission rate of said media data, transcoding said media data stream to a selected bit rate of said plurality of bit rates.

7. The method of claim 1 further comprising:
if it is determined to change said transmission rate of said media data, using media transcoding to change said transmission rate of said media data.

8. The method of claim 1 wherein said data-link information is obtained at said data-link layer that comprises an 802.11 media access control layer.

9. The method of claim 1 wherein said data-link information comprises acknowledgement information from said electronic device.

10. The method of claim 1 wherein said data-link information comprises retransmission information.

11. The method of claim 10 further comprising:
determining whether to resend a multiple-resent packet responsive to said retransmission information.

12. The method of claim 11 wherein said resending determination is based at least in part on a number of packet sending retries.

13. The method of claim 11 wherein said resending determination is based at least in part on a final decoded video quality, wherein a frame type is an indicator of video quality when a packet is lost.

14. The method of claim 1 further comprising:
determining additional bandwidth based on data-link information from bursts of transmitted video packets.

15. A non-transitory computer-readable storage medium having embodied thereon a program, said program being executable by a computing device for performing a method for wireless media streaming comprising:
receiving media data from a remote media source;
transmitting said media data over a wireless connection to an electronic device;
receiving data-link information from said electronic device;
passing said data-link information to a status buffer located in a data-link layer and a filter located in said data link layer, wherein said filter filters packets based on at least one sequence number of a packet that was marked in said status buffer, and wherein feedback and data is provided to a transmission rate determiner in an application layer without requiring storage of information for packets not within flows of interest;

accessing said data-link information at an application layer, wherein said data-link information is obtained without using an application-layer client;

determining at said application layer whether to change a transmission rate of said media data to said electronic device based at least in part on said data-link information; and if it is determined to change said transmission rate of said media data, communicating said change to said remote media source.

16. The non-transitory computer-readable storage medium of claim 15, wherein said method further comprises:

if it is determined to change said transmission rate of said media data, requesting said media data encoded at a different bit rate.

17. The non-transitory computer-readable storage medium of claim 15, wherein said media data comprises a plurality of media data streams encoded at different bit rates, said method further comprising:

if it is determined to change said transmission rate of said media data, selecting which media data stream of said plurality of media data streams to transmit to said electronic device.

18. The non-transitory computer-readable storage medium of claim 15, wherein said media data comprises a scalably encoded media data stream that can be transcoded to a plurality of bit rates, said method further comprising:

if it is determined to change said transmission rate of said media data, transcoding said media data stream to a selected bit rate of said plurality of bit rates.

19. The non-transitory computer-readable storage medium of claim 15, wherein said method further comprises:

if it is determined to change said transmission rate of said media data, changing said transmission rate of said media data.

20. A device for wireless media streaming transmission comprising:

a receiver for receiving media data from a remote media source;

a wireless transmitter/receiver configured to transmit said media data over a wireless connection to an electronic device, to receive data-link information from said electronic device, to pass said data-link information to a status buffer located in a data-link layer and a filter located in said data link layer, wherein said filter filters packets based on at least one sequence number of a packet that was marked in said status buffer, and wherein feedback and data is provided to a transmission rate determiner in an application layer without requiring storage of information for packets not within flows of interest, to access said data-link information at an application layer, wherein said data-link information is obtained without using an application-layer client, and to determine at said application layer whether to change a transmission rate of said media data based, at least in part, on said data-link information, wherein determining whether to change said transmission rate is transparent to said electronic device; and a remote media source transmitter for communicating said change in transmission rate to said remote media source.

* * * * *